(12) United States Patent
Hepp

(10) Patent No.: US 9,981,628 B2
(45) Date of Patent: May 29, 2018

(54) METHOD FOR FOLDING AN AIRBAG, AND AIRBAG MODULE

(71) Applicant: TRW AUTOMOTIVE SAFETY SYSTEMS GMBH & CO. KG, Aschaffenburg (DE)

(72) Inventor: Stefan Hepp, Glattbach (DE)

(73) Assignee: TRW Automotive Safety Systems GmbH (DE)

( * ) Notice: Subject to any disclaimer, the term of this patent is extended or adjusted under 35 U.S.C. 154(b) by 0 days. days.

(21) Appl. No.: 15/313,579

(22) PCT Filed: Jun. 2, 2015

(86) PCT No.: PCT/EP2015/001121
§ 371 (c)(1),
(2) Date: Nov. 23, 2016

(87) PCT Pub. No.: WO2015/185210
PCT Pub. Date: Dec. 10, 2015

(65) Prior Publication Data
US 2017/0197577 A1      Jul. 13, 2017

(30) Foreign Application Priority Data
Jun. 2, 2014   (DE) .................. 10 2014 007 834

(51) Int. Cl.
*B60R 21/16*   (2006.01)
*B60R 21/237*  (2006.01)
*B60R 21/203*  (2006.01)

(52) U.S. Cl.
CPC .......... *B60R 21/237* (2013.01); *B60R 21/203* (2013.01)

(58) Field of Classification Search
CPC ... B60R 21/237; B60R 21/201; B60R 21/203; B60R 2021/2178
See application file for complete search history.

(56) References Cited

U.S. PATENT DOCUMENTS

| 5,178,407 | A | * | 1/1993  | Kelley   | B60R 21/231 280/728.1 |
| 5,360,387 | A | * | 11/1994 | Baker    | B60R 21/237 280/243   |
| 5,364,126 | A | * | 11/1994 | Kuretake | B60R 21/237 102/531   |
| 5,375,393 | A | * | 12/1994 | Baker    | B60R 21/237 493/405   |

(Continued)

FOREIGN PATENT DOCUMENTS

| DE | 19502744 | 3/1996 |
| DE | 10144776 | 4/2003 |

*Primary Examiner* — Toan To
(74) *Attorney, Agent, or Firm* — Tarolli, Sundheim, Covell & Tummino LLP

(57) ABSTRACT

A method for folding an airbag (10) provides that the airbag (10) is first folded in a zigzag manner, that a gas generator (14) and/or an airbag-retaining metal sheet is/are placed in the airbag (10), whereupon end portions of the airbag extend around the outer circumference of the gas generator (14) and/or of the airbag-retaining metal sheet toward each other in opposite directions up to a folding zone (26) from where the end portions are folded over outwards and are laid down in the opposite direction. Also disclosed is a corresponding airbag module.

17 Claims, 2 Drawing Sheets

(56) References Cited

U.S. PATENT DOCUMENTS

| | | | | |
|---|---|---|---|---|
| 5,425,551 A * | 6/1995 | Hawthorn | B60R 21/237 |
| | | | 280/728.1 |
| 6,224,100 B1 * | 5/2001 | Kamano | B60R 21/237 |
| | | | 280/728.1 |
| 6,250,675 B1 * | 6/2001 | Dietsch | B60R 21/237 |
| | | | 280/743.1 |
| 6,286,866 B1 * | 9/2001 | Satge | B60R 21/237 |
| | | | 280/743.1 |
| 6,739,622 B2 * | 5/2004 | Halford | B60R 21/237 |
| | | | 280/743.1 |
| 6,918,868 B2 * | 7/2005 | Vitet | B60R 21/237 |
| | | | 280/728.1 |
| 7,125,044 B2 * | 10/2006 | Nishijima | B60R 21/237 |
| | | | 280/728.1 |
| 8,523,223 B2 * | 9/2013 | Miyata | B60R 21/233 |
| | | | 280/732 |
| 2001/0017460 A1 * | 8/2001 | Igawa | B60R 21/21656 |
| | | | 280/731 |
| 2006/0175818 A1 * | 8/2006 | Thomas | B60R 21/203 |
| | | | 280/743.1 |
| 2007/0096448 A1 * | 5/2007 | Yokoyama | B60R 21/237 |
| | | | 280/743.1 |
| 2011/0127756 A1 * | 6/2011 | Buchholz | B60R 21/237 |
| | | | 280/743.1 |
| 2013/0320655 A1 * | 12/2013 | Takagi | B60R 21/237 |
| | | | 280/743.1 |

* cited by examiner

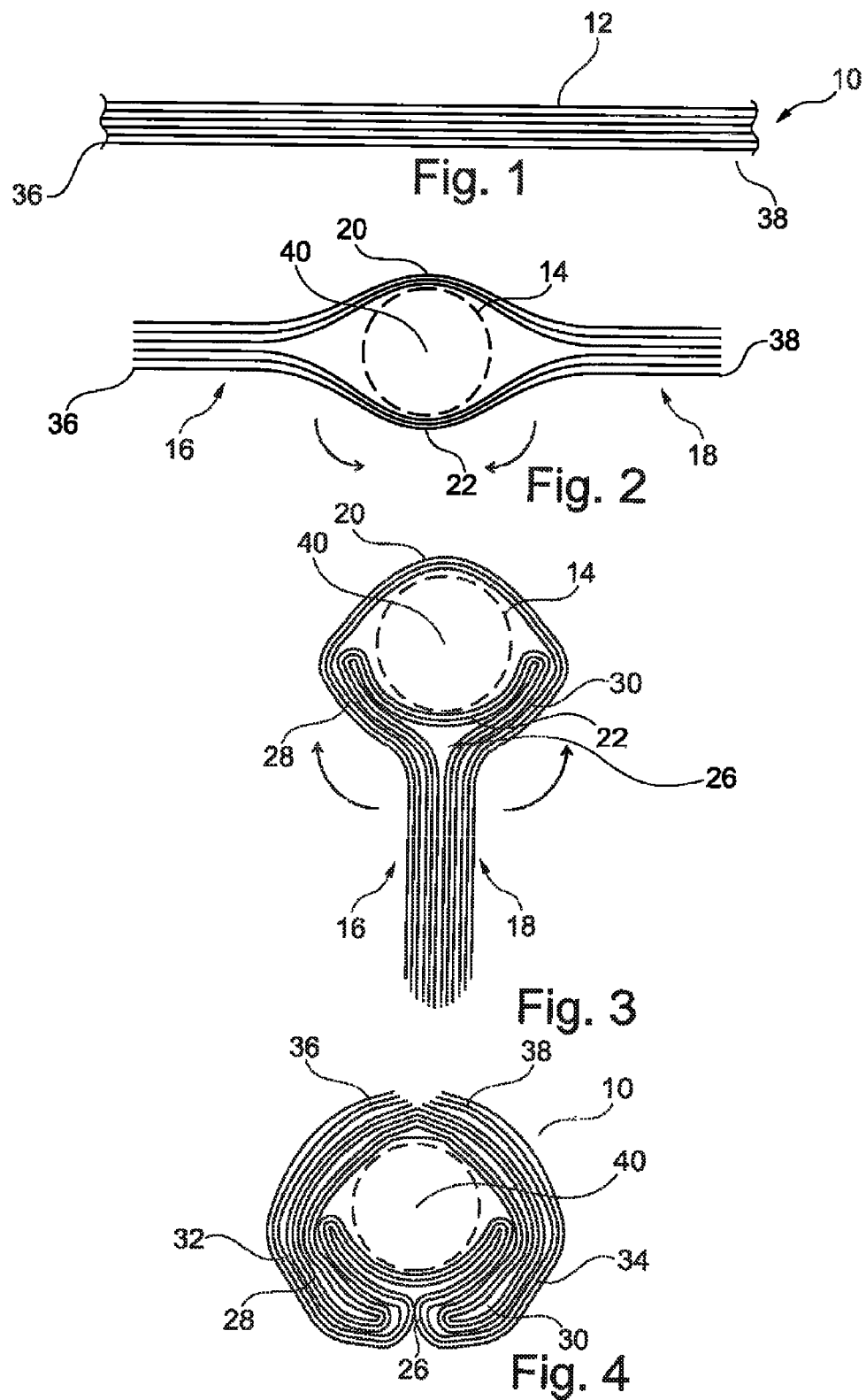

METHOD FOR FOLDING AN AIRBAG, AND AIRBAG MODULE

RELATED APPLICATIONS

This application corresponds to PCT/EP2015/001121, filed Jun. 2, 2015, which claims the benefit of German Application No. 10 2014 007 834.5, filed Jun. 2, 2014, the subject matter of which are incorporated herein by reference in their entirety.

BACKGROUND OF THE INVENTION

The invention relates to a method for folding an airbag as well as to an airbag module comprising a gas generator and an airbag in which the gas generator is located.

The folding of an airbag is an extremely demanding technique, as folding has a significant influence on the later unfolding operation, because the folding itself has to be perfectly reproducible so as to minimize the tolerances in positioning the folds and the airbag and because the folding also has to be carried out in an economical manner.

In particular for folding steering wheel airbags there are most various variants. For example, DE 101 44 776 C2 describes a method in which the steering wheel airbag is first zigzag folded so that an elongate airbag package is resulting which is then folded over inwards with its ends, namely ahead of the gas generator and consequently in the vicinity of the deployment opening in the airbag module.

From DE 195 02 744 C1 likewise a method for folding a steering wheel airbag is known in which the airbag is folded into an elongate package by parallel zigzag folding, wherein the gas generator is located in the middle of said package. Each of the two ends of the elongate package is folded in wave shape in opposite directions and then is forced from outside radially in the direction of the gas generator.

SUMMARY OF THE INVENTION

It is the object of the invention to provide an alternative folding behavior which produces an airbag to be accommodated in a very space-saving manner which offers excellent deployment properties and above all can be folded very easily and quickly.

The method according to the invention provides the following steps of:
a) folding an airbag in a zigzag manner into an elongate state,
b) inserting a gas generator and/or an airbag-retaining metal sheet into the airbag, with the gas generator and/or the airbag-retaining metal sheet being located in the central third of the longitudinally folded airbag so that two end portions of the airbag are projecting laterally from the gas generator,
c) guiding the end portions of the airbag around the outer circumference of the gas generator and/or of the airbag-retaining metal sheet in opposite circumferential directions and toward each other up to a folding zone in which the end portions of the airbag at least almost contact each other,
d) folding over the end portions of the airbag from the folding zone outwards and guiding the end portions of the airbag in the opposite direction around the outer circumference of the gas generator and/or of the airbag-retaining metal sheet and around the internal part of the airbag end portions lying thereon for forming an external part.

The method according to the invention enables the airbag to be laid very closely against the outer circumference of the gas generator on the outside by means of two large superimposed parts of each end portion of the airbag each extending by almost 180° in the circumferential direction. That is to say, the zigzag-shaped elongate airbag package subsequently is not frequently folded once again but extends in curved shape around the gas generator or the airbag-retaining metal sheet so as to be then folded once outwards instead of inwards as in prior art. Hence also the space along the outer circumference of the gas generator is exploited almost in its entirety as an accommodation space for the airbag package.

Preferably the external parts of the airbag end portions should be folded over so far that the ends thereof contact each other. This, too, is carried out with respect to preferably exploiting the distance around the airbag.

Moreover it may be provided to position the gas generator in step b) within the airbag so that transversely to the longitudinal extension of the zigzag-folded airbag folds extend on opposite circumferential sides of the gas generator along the gas generator. In this intermediate state of the folding process the elongate airbag package is quasi divided towards its center info two package portions. Whereas the end portions of the airbag are located at 3 o'clock and at 9 o'clock relative to the centrally arranged gas generator, for example, the splitting package portions extend in the center on the one hand at 6 o'clock and on the other hand at 12 o'clock along the gas generator and/or of the airbag-retaining metal sheet.

The airbag package itself can be folded, on the one hand, in a more reproducible manner and, on the other hand, in a more space-saving manner, when the airbag is thermally heated and/or compressed for creating the zigzag folding. When the airbag is heated and compressed, a so-called thermofixed pre-folding occurs which results in an elongate concertina-like airbag package that forms an intermediate state of the airbag.

An embodiment of the invention provides that the gas generator is toroidal and the folds are laid along the outer circumference of the torus.

In particular, the airbag module in question is a steering wheel module.

The airbag may be folded and accommodated in a cup-shaped module casing.

The folded portions of the airbag can extend in a peripheral gap between the outer circumferential wall of the module casing and the outer circumference of the gas generator.

At least a part, preferably a majority of the end face of the gas generator is covered only by one airbag layer in the deployment direction. This means that, on the end face toward the exiting direction of the airbag, the gas generator is neither completely nor in large part covered by the airbag package. In this central area relatively little resistance is offered to the gas during deployment, which ensures rapid deployment in the central area of the airbag.

As an option it may be provided that from the internal part of each of the two airbag end portions a folding bead projecting in a jaw-like manner, i.e. a segment of the airbag package, protrudes from the end face of the gas generator.

According to a preferred embodiment the individual folding heights of the zigzag-folded airbag layers are formed to have different heights. Preferably in this case a further inwardly located fold (to be arranged more closely to the gas generator) is formed having a lower height than a further outwardly located fold (to be arranged more distant from the gas generator). It is preferred that a minimum fold height is designed to be smaller than half the height of the gas generator or of the folded airbag package. Apart from that, it is preferred that a maximum fold height is designed to be larger than half the height of the gas generator or of the folded airbag package, especially approximately or (except a thickness of one to five times the material thickness of the airbag material) exactly as high as the height of the gas generator or of the folded airbag package. Accordingly it is preferred that a minimum fold height of less than 30 mm, preferably than 20 mm is formed. In addition, it is preferred that a maximum fold height of more than 35 mm, preferably more than 50 mm, further preferred more than 70 mm is formed.

This is beneficial in that the folding can be appropriately adapted to the module environment (interior geometry) so as to permit optimum deployment (so-called cordial deployment), especially in the case of in-and-out-of-position load cases. It is a particular advantage of this embodiment of the folding according to the invention that this deployment technique or characteristic allows renouncing two-stage pyrotechnical airbag gas generators in some applications for the protection in so-called out-of-position situations.

Another advantage of the folding technique according to the invention is an excellent and rapid deployment characteristic of the airbag between the lower steering wheel rim and the abdomen of the driver which offers a further improvement as compared to random folding. This is especially effective in vehicle situations in which the occupant is seated close to the steering wheel (e.g. the so-called 5% woman).

Moreover the invention also relates to an airbag module comprising a gas generator and an airbag in which the gas generator is located. The airbag is laid into plural folds extending in parallel to each other so as to form an elongate package in an intermediate state. The gas generator is located in the central third of the elongate package, wherein starting from the central third end portions of the airbag of the package are folded into at least two package layers, hereinafter referred to as parts, wherein the two inner package layers (parts) extend along the outer circumference of the gas generator toward each other up to a folding zone and then, when folded over outwards, extend along the respective inner package layer in the opposite direction. The two end portions of the airbag thus are laid along the outer circumference of the airbag so as to form an internal part. The end portions of the airbag then are folded over outwards so as to provide an external part adjacent to the internal part of the package.

In accordance with a preferred embodiment, individual ones of the folding heights of the zigzag-folded airbag layers are different in height. Preferably there is arranged a further inwardly located fold (to be arranged more closely to the gas generator) having a smaller height than a further outwardly located fold (to be arranged more distant from the gas generator). It is preferred that a minimum fold height is designed to be smaller than half the height of the gas generator or of the folded airbag package. In addition, it is preferred that a maximum fold height is designed to be larger than half the height of the gas generator or of the folded airbag package, especially approximately or (except a thickness of one to five times the material thickness of the airbag material) exactly as high as the height of the gas generator or of the folded airbag package. In this context a minimum fold height is preferred to be lower than 30 mm, preferably lower than 20 mm. In addition, a maximum fold height is preferred to be higher than 35 mm, preferably higher than 50 mm, further preferred higher than 70 mm.

This is beneficial in that the folding can be appropriately adapted to the module environment (interior geometry) so as to permit optimum deployment (so-called cordial deployment), especially for in-and-out-of-position load cases. It is a particular advantage of this embodiment of the folding according to the invention that this deployment technique or characteristic allows renouncing two-stage pyrotechnical airbag gas generators in some applications for the protection in so-called out-of-position situations.

Another advantage of the folding according to the invention is an excellent and rapid deployment characteristic of the airbag between the lower steering wheel rim and the abdomen of the driver which offers a further improvement as compared to random folding. This is especially effective in vehicle situations in which the occupant is seated close to the steering wheel (e.g. the so-called 5% woman).

The airbag end portions may contact each other in the folding zone and/or at their ends.

The gas generator is toroidal, for example, and the folds extend along the outer circumference of the gas generator.

The airbag may include folds in the central third extending along opposite circumferential sides of the gas generator.

BRIEF DESCRIPTION OF THE DRAWINGS

An embodiment of the invention shall be illustrated in the following drawings, in which:

FIG. 1 shows a first step of the method according to the invention for folding an airbag, FIG. 2 shows a second step for folding the airbag according to the invention, FIG. 3 shows a third step for folding the airbag according to the invention, FIG. 4 shows the airbag folded according to the invention in a fop view, drawn without an airbag module.

DESCRIPTION

Figure 5:
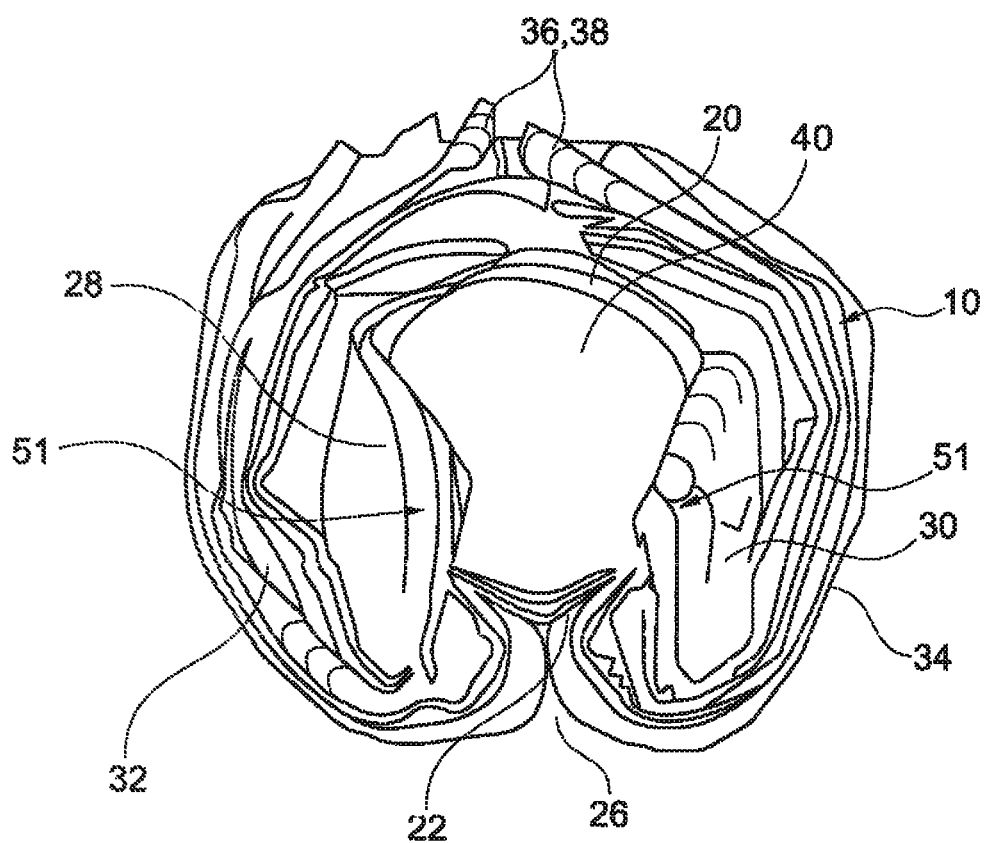
FIG. 5 shows a top view of a further embodiment of an airbag folded according to the invention.

FIG. 1 illustrates an airbag 10 in the form of a steering wheel airbag pre-folded in zigzag shape and comprising numerous folds 12 extending in parallel to each other.

Said folding of the airbag 10 into an elongate airbag package shown in FIG. 1 is performed, for instance, by a so-called thermofixed pre-folding in which the airbag 10 is compressed into plural Z-shaped folds while simultaneously heat is supplied. A concertina-like structure is resulting.

The airbag includes a so-called injection mouth, i.e. an opening disposed in its central third related to the elongate package in FIG. 1.

After the folding according to FIG. 1, either the gas generator 14, in this case a toroidal gas generator 14, and/or a retaining metal sheet for the gas generator 14 is/are inserted through said opening.

The retaining metal sheet equally takes the shape shown in FIG. 2 and during the folding process possibly also serves as a placeholder for the space later occupied by the gas generator 14. After inserting the gas generator 14 or the corresponding retaining metal sheet, the airbag package adopts the structure shown in FIG. 2 including two end portions 16, 18 of the airbag pointing in two opposite directions related to the gas generator 14 or the retaining metal sheet in which the package maintains the shape as shown in FIG. 1 and including a central portion in which the airbag package splits into two parts 20, 22 extending along opposite circumferential sides of the gas generator 14 or of the retaining metal sheet in close contact with the same.

In a subsequent step the two end portions 16, 18 of the airbag are guided, as illustrated in FIG. 2 by the arrows, in opposite circumferential directions and toward each other around the outer circumference of the gas generator 14 and/or of the retaining metal sheet so that the respective portions extend in close contact with the outer circumference. This guiding around then results in the intermediate state shown in FIG. 3.

The end portions 16, 18 extending toward each other then will contact each other or approximately contact each other in a so-called folding zone 26 located at half the peripheral distance between the two end portions 18, 18 of the airbag related to FIG. 3 at approximately 6 o'clock.

In said folding zone 26 the end portions 16, 18 of the airbag are folded over, as shown by the arrow direction in FIG. 3, outwardly and in the opposite direction again and in turn are laid against the already existing package from outside. The state shown in FIG. 4 is resulting.

Up to the folding zone 26 thus an internal part 28, 30 of the respective airbag end portion 16 and, resp., 18 is resulting. After folding over outwards, respective external parts 32 and, resp., 34 of the corresponding end portion 16, 18 of the airbag are laid along said internal part 28, 30. Optionally the ends 36 and 38, resp., of the airbag end portions 16 and, resp., 18 then may contact each other. This is not absolutely necessary, however.

As can be inferred from FIG. 4, the folded part of the airbag 10 extends along the outer circumference of the gas generator 14. That is to say, it is not laid or folded onto the end face 40 of the gas generator 14 facing the deployment direction (from the plane of projection). This area above the end face 40 remains completely or largely free from the folded package of the airbag 10 so that only one layer of the airbag 10 extends over the end face 40.

As regards the drawings, it is mentioned that the folds in practice extend by far more closely to each other, as a matter of course; they are shown at a definite distance from each other in the Figures for graphical and illustrative reasons only.

In the embodiment according to FIG. 5 jaw-like folding beads 51 projecting radially inwardly and protruding from a part of the end face 40 of the gas generator are shown. Said folding beads 51 are portions of the internal part 28, 30 of the end portions 16 and 18, resp., of the airbag. As is illustrated in FIG. 5, however, the majority of the end face 40 of the gas generator 14 is still covered by one layer only and is not covered by the airbag package.

Figure 6:
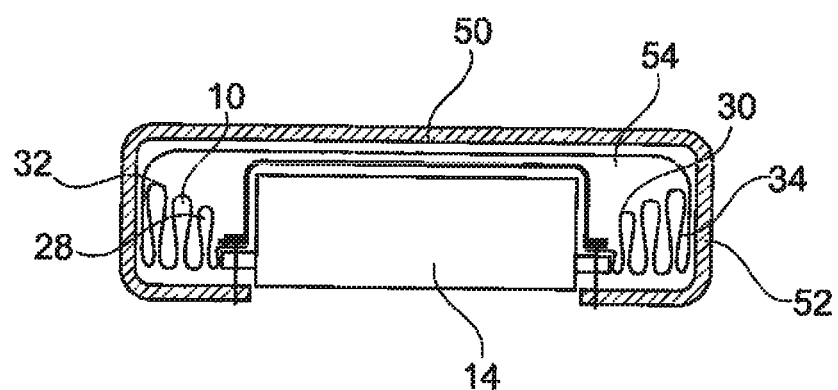
FIG. 6 shows a sectional view across an airbag module according to the invention.

FIG. 6 illustrates a section across an airbag module according to the invention in which the airbag 10 presented in the afore-described Figures surrounds the gas generator 14. Moreover the airbag module includes a module casing 50 having an outer peripheral wall 52. As is evident from FIG. 6, between the outer circumference of the gas generator 14 and the outer peripheral wall 52 a circumferential gap 54 is formed into which the airbag is folded or, resp., in which the folded airbag extends.

Also, in FIG. 6 it is especially clearly visible that according to a preferred embodiment shown here the individual folding heights of the zigzag-folded airbag layers are designed to be of different height. (When speaking of the height of the folds, it has to be considered or measured in the direction of a central or symmetry axis of the gas generator 14, viz. perpendicularly to the end face 40 thereof). Preferably, a further inwardly located fold 28, 30 (to be arranged more closely to the gas generator 14) is designed to have a smaller height than a further outwardly located fold 32, 34 (to be arranged more distant from the gas generator). A minimum fold height is preferred to be designed smaller than half the height (or than ⅔ of the height) of the gas generator or of the folded airbag package. In this way, gas may flow out of the outlet orifices of the gas generator over the heads of the folds to the inside of the portion of the airbag package facing the driver and inflate the airbag in a primary inflating operation more quickly toward the driver, before the deployment toward the side takes place, in addition, it is preferred that a maximum fold height is designed larger than half the height of the gas generator or of the folded airbag package, especially approximately or (except a thickness of one to five times the material thickness of the airbag material) exactly as high as the height of the gas generator or of the folded airbag package. Accordingly, a minimum fold height is preferred to be designed less than 30 mm, preferably less than 20 mm. In addition, a maximum fold height is preferred to be designed higher than 35 mm, preferably higher than 50 mm, further preferred higher than 70 mm. It is especially preferred that the height of the folds increases from the inside to the outside (from the gas generator 14 toward the module edge). In this way the afore-described effect is even increased.

As a matter of course, this embodiment of the folding increasing toward the outside is or can be configured especially (or only) for the innermost folding packages or folding package portions 20, 22 (located closest to the gas generator 14) (FIG. 2, 3). In the outer or re-folded portions 16, 18 then preferably an alternately decreasing and increasing contour of the folding heights (in V or VV shape) is formed. However, this does not affect the afore-described effect.

The invention claimed is:

1. A method for folding an airbag (10) comprising the following steps of:
    zigzag-folding the airbag (10) into an elongate state,
    inserting a gas generator (14) and/or an airbag-retaining metal sheet into the airbag (10), wherein the gas generator (14) and/or the airbag-retaining metal sheet is/are located in the central third of the airbag (10) folded in elongate shape so that two end portions (16, 18) of the airbag project from the gas generator (14) and/or from the airbag-retaining metal sheet,
    guiding the airbag end portions (16, 18) around the outer circumference of the gas generator (14) and/or of the airbag-retaining metal sheet in opposite directions toward each other up to a folding zone (26) in which the end portions (16, 18) of the airbag at least almost contact each other, and
    folding over the end portions (16, 18) of the airbag from the folding zone (26) outwards and guiding the airbag end portions (16, 18) in the opposite direction around the outer circumference of the gas generator (14) and/or of the airbag-retaining metal sheet and around internal parts (28, 30) of the airbag end portions (16, 18) located thereon for forming external parts (32, 34).

2. The method according to claim 1, wherein the external parts (32, 34) of the end portions (16, 18) of the airbag are folded over so far that their ends (36, 38) contact each other.

3. The method according to claim 1, wherein the gas generator (14) and/or the airbag-retaining metal sheet in step b) is/are positioned in the airbag (10) so that transversely to the longitudinal extension of the elongate folded airbag (10) folds (20, 22) extend on opposite circumferential sides of the gas generator (14) and/or of the airbag-retaining metal sheet along the gas generator (14) and/or along the airbag-retaining metal sheet.

4. The method according to claim 1, wherein the airbag (10) is thermally heated and/or compressed for forming the zigzag folding.

5. The method according to claim 1, wherein the gas generator (14) is toroidal and the folds are laid along the outer circumference of the torus.

6. The method according to claim 1, wherein the airbag (10) when folded is accommodated in a cup-shaped module casing (50).

7. The method according to claim 6, wherein the folded portions of the airbag (10) extend in a peripheral gap (54) between the outer circumferential wall (52) of the module casing (50) and the outer circumference of the gas generator (14) and/or that at least a part, preferably a majority of an end face (40) of the gas generator (14) facing in the deployment direction is covered by only one airbag layer.

8. The method according to claim 1, wherein folds (20, 22; 28, 32; 30, 34) of the airbag (10) in individual folding heights of the zigzag-folded airbag layers are designed to be of different height.

9. The method according to claim 8, wherein a further inwardly located fold (28, 30) of lower height than a further outwardly located fold (32, 34) is formed, wherein at least one of: a minimum fold height is designed to be smaller than half the height or than 2/3 of the height of the gas generator or of the folded airbag package, and wherein a maximum fold height is designed to be larger than half the height of the gas generator or of the folded airbag package.

10. The method according to claim 8, wherein a maximum fold height is designed to be approximately as high as the height of the gas generator or of the folded airbag package, and the height of the folds increases from the inside to the outside.

11. An airbag module comprising a gas generator (14) and an airbag (10) in which the gas generator (14) is located, wherein the airbag (10) is laid into plural folds extending in parallel to each other so as to form an elongate package in an intermediate state, wherein the gas generator (14), related to the length of the parallel folds, is positioned in the central third in the airbag (10), and wherein the outer thirds form airbag end portions (16, 18) of the airbag (10) being folded into at least two parts (28, 30, 32, 34), wherein two internal parts (28, 30) extend along the outer circumference of the gas generator (14) toward each other up to a folding zone (26) and wherein a respective external part (32, 34) of each airbag end portion (16, 18) is folded over outwards starting from the folding zone (26) and extends along its associated internal part (28, 30) in the opposite direction.

12. The airbag module according to claim 11, wherein the end portions (16, 18) of the airbag contact each other in the folding zone (26) and/or with their ends (36, 38).

13. The airbag module according to claim 11, wherein the gas generator (14) is toroidal and the folds extend along its outer circumference and/or that in the central third the airbag (10) includes folds (20, 22) which extend along opposite circumferential sides of the gas generator (14).

14. The airbag module according to claim 11, wherein folds (20, 22; 28, 32; 30, 34) of the airbag (10) at individual folding heights are designed to be of different heights, wherein the height of the folds increases from the inside to the outside, and wherein the folds are zigzag folds.

15. The airbag module according to claim 14, wherein a further inwardly located fold (28, 30) is designed to have a lower height than a further outwardly located fold (32, 34), and wherein at least one of: a minimum fold height is designed to be smaller than half the height or than 2/3 of the height of the gas generator or of the folded airbag package, and a maximum fold height is designed to be larger than half the height of the gas generator or of the folded airbag package.

16. The airbag module according to claim 14, wherein a maximum fold height is designed to be approximately as high as the height of the gas generator or of the folded airbag package, and wherein the height of the folds increases from the inside to the outside.

17. The airbag module according to claim 11, wherein it is a steering wheel module.

* * * * *